US011638889B2

(12) United States Patent
Weaver et al.

(10) Patent No.: US 11,638,889 B2
(45) Date of Patent: May 2, 2023

(54) FILTER COVER PROTECTION AGAINST EXTERNAL CONTAMINATION

(71) Applicant: PRATT & WHITNEY CANADA CORP., Longueuil (CA)

(72) Inventors: Paul Weaver, Chateauguay (CA); Rose Beaulieu, Verdun (CA); Pierre Gauvin, St-Bruno-de-Montarville (CA); Louis Brillon, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 890 days.

(21) Appl. No.: 16/582,371

(22) Filed: Sep. 25, 2019

(65) Prior Publication Data

US 2021/0086110 A1 Mar. 25, 2021

(51) Int. Cl.
  *B01D 29/33* (2006.01)
  *B01D 35/30* (2006.01)
  *B01D 29/21* (2006.01)

(52) U.S. Cl.
  CPC ........... *B01D 29/333* (2013.01); *B01D 35/30* (2013.01); *B01D 2201/306* (2013.01); *B01D 2201/307* (2013.01)

(58) Field of Classification Search
  CPC .................. B01D 29/333; B01D 35/30; B01D 2201/306; B01D 2201/307; B01D 29/21; B01D 2201/302; B01D 35/005; B01D 2201/305; B01D 29/96; B01D 2201/291; B01D 2201/4015; B01D 2201/4023; B01D 27/08; B01D 35/306; B01D 2201/301; B01D 2201/4007; B01D 2201/4076;

(Continued)

(56) References Cited

U.S. PATENT DOCUMENTS 2,463,800 A   3/1949 Pate
4,776,617 A * 10/1988 Sato ................... F16L 27/1274
285/302

(Continued)

FOREIGN PATENT DOCUMENTS

EP         0269054 B1 *  6/1988
EP   WO2013107572 A  *  7/2013

OTHER PUBLICATIONS

English language machine translation of WPO2013107572A1, 17 pages, No Date.*

(Continued)

*Primary Examiner* — Pranav N Patel
(74) *Attorney, Agent, or Firm* — Norton Rose Fulbright Canada LLP.

(57) ABSTRACT

A fluid filter arrangement, with protection against external contamination, the filter arrangement comprising: a fluid circulating system; a filter cartridge having an exterior surface; a housing having an internal fluid chamber surrounding the exterior surface of the filter cartridge, an open end through which the filter cartridge can pass along a housing axis; and a cover sealed over the open end of the housing in a closed position, the cover in an open position exposing the open end of the housing, the cover including a fluid passage in communication with the internal fluid chamber in the closed position, the cover fluid passage being in communication with the fluid circulating system in the closed position and in the open position.

20 Claims, 18 Drawing Sheets

(58) Field of Classification Search
CPC ........ B01D 2201/4046; B01D 46/0004; B01D 46/0005; B01D 2279/60; B01D 46/2411; B01D 2201/30; B01D 2265/028; B01D 2313/10; B01D 2313/13; F02M 37/42; F01M 2011/031
See application file for complete search history.

(56) References Cited

U.S. PATENT DOCUMENTS

| | | | |
|---|---|---|---|
| 5,589,059 A * | 12/1996 | Semar | B01D 29/055 |
| | | | 210/138 |
| 6,540,914 B1 | 4/2003 | Smith | |
| 8,226,822 B2 | 7/2012 | Paradise | |
| 10,024,239 B2 | 7/2018 | Turcotte | |
| 2014/0231336 A1* | 8/2014 | Pribanic | F02M 37/42 |
| | | | 210/446 |
| 2015/0192033 A1* | 7/2015 | Garassino | F01M 5/00 |
| | | | 62/468 |
| 2017/0298881 A1* | 10/2017 | Malgorn | B01D 36/005 |
| 2019/0046907 A1 | 2/2019 | Willems | |
| 2019/0345853 A1 | 11/2019 | Stachowiak | |
| 2021/0245106 A1* | 8/2021 | Rivat | G01N 1/4077 |

OTHER PUBLICATIONS

English language machine translation of EP0269054B1, 6 pages, No Date.*

* cited by examiner

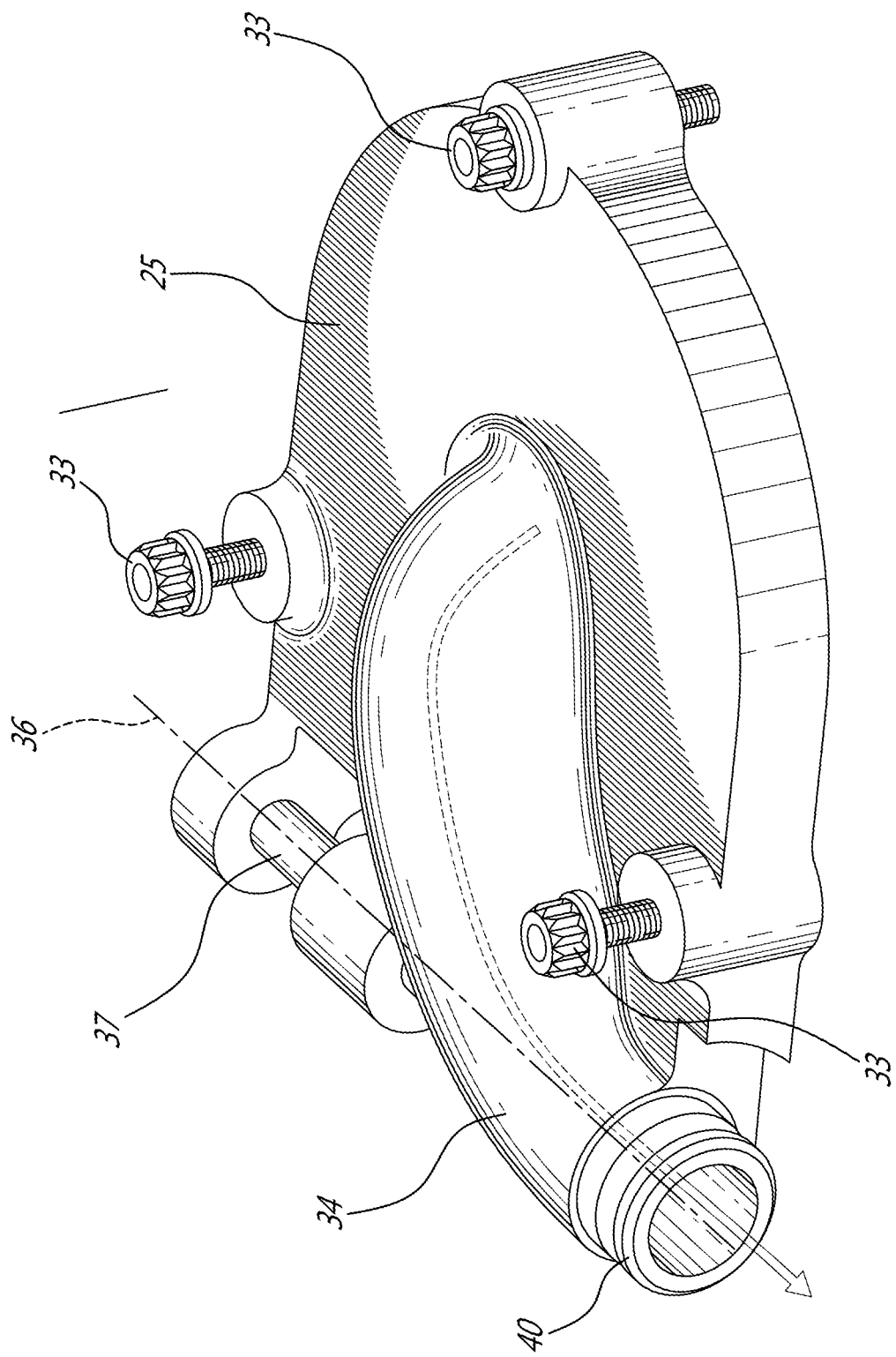

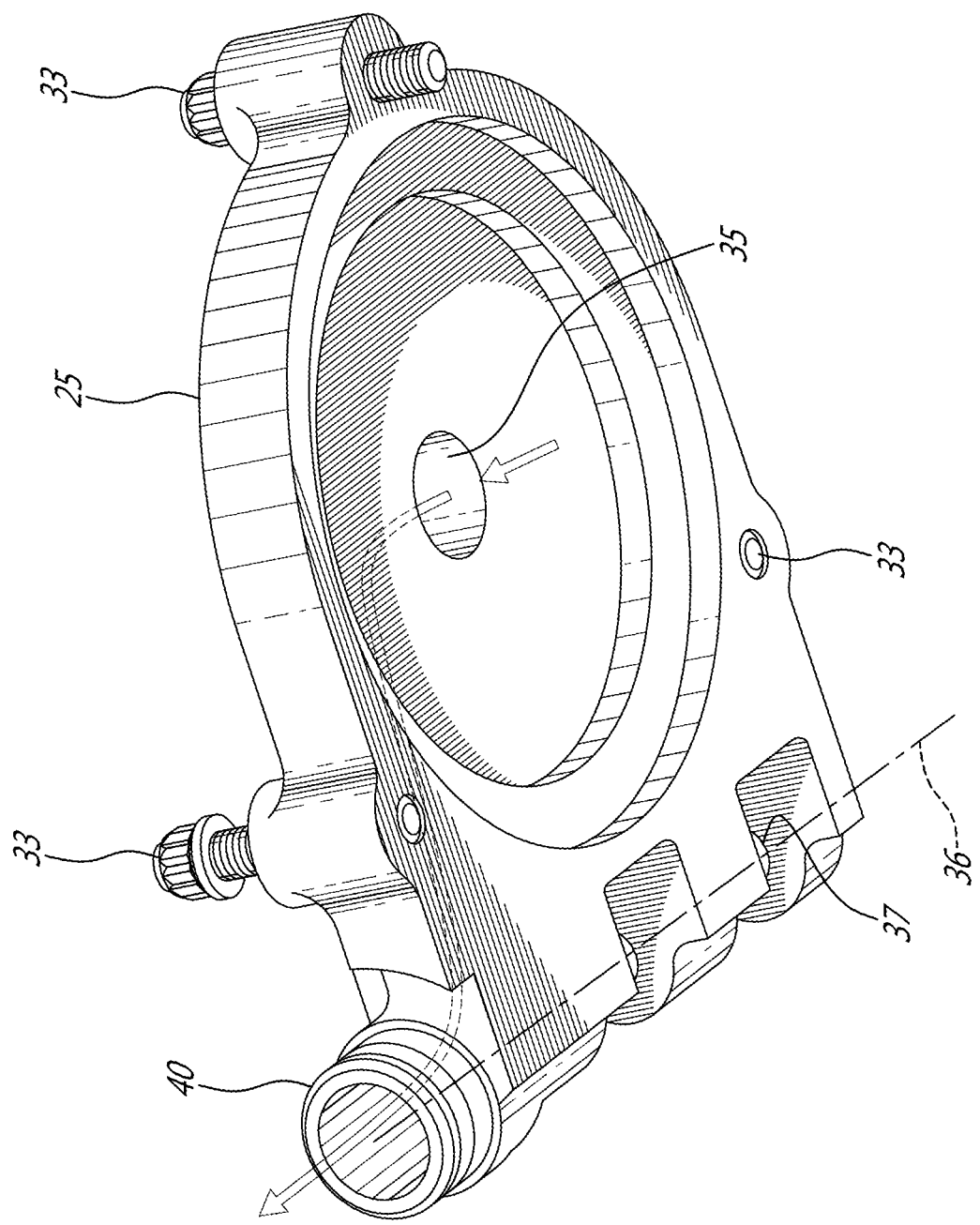

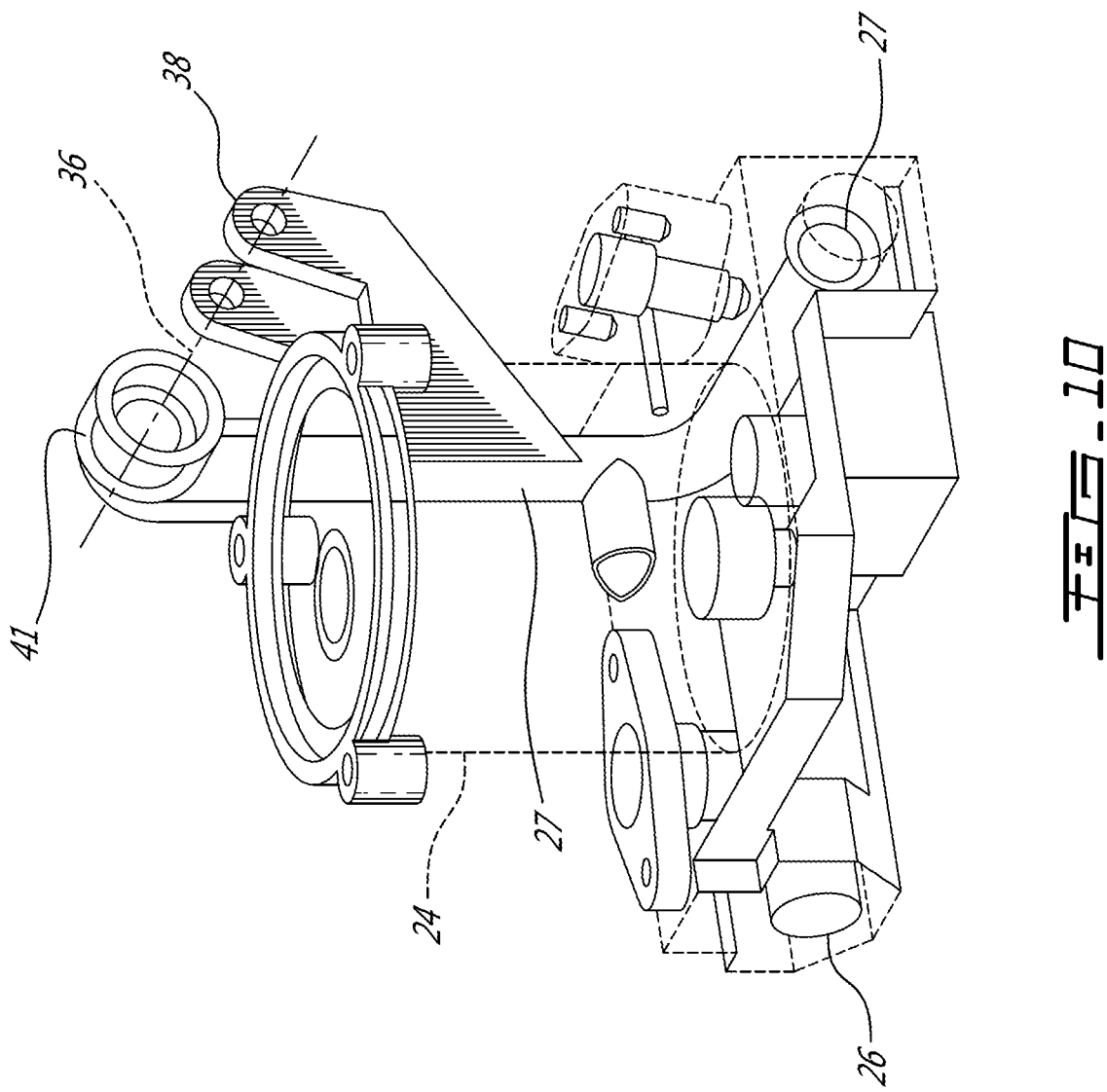

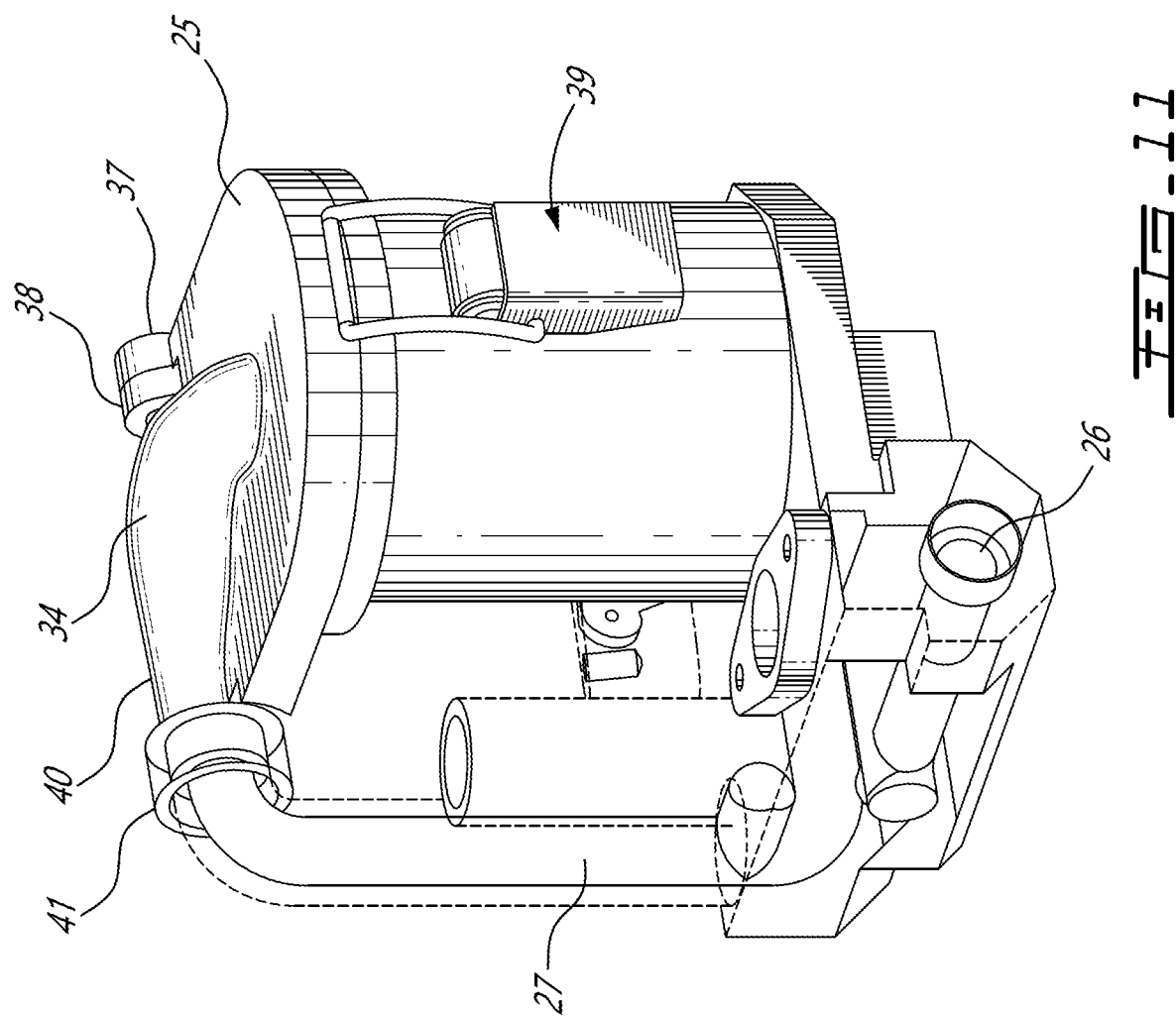

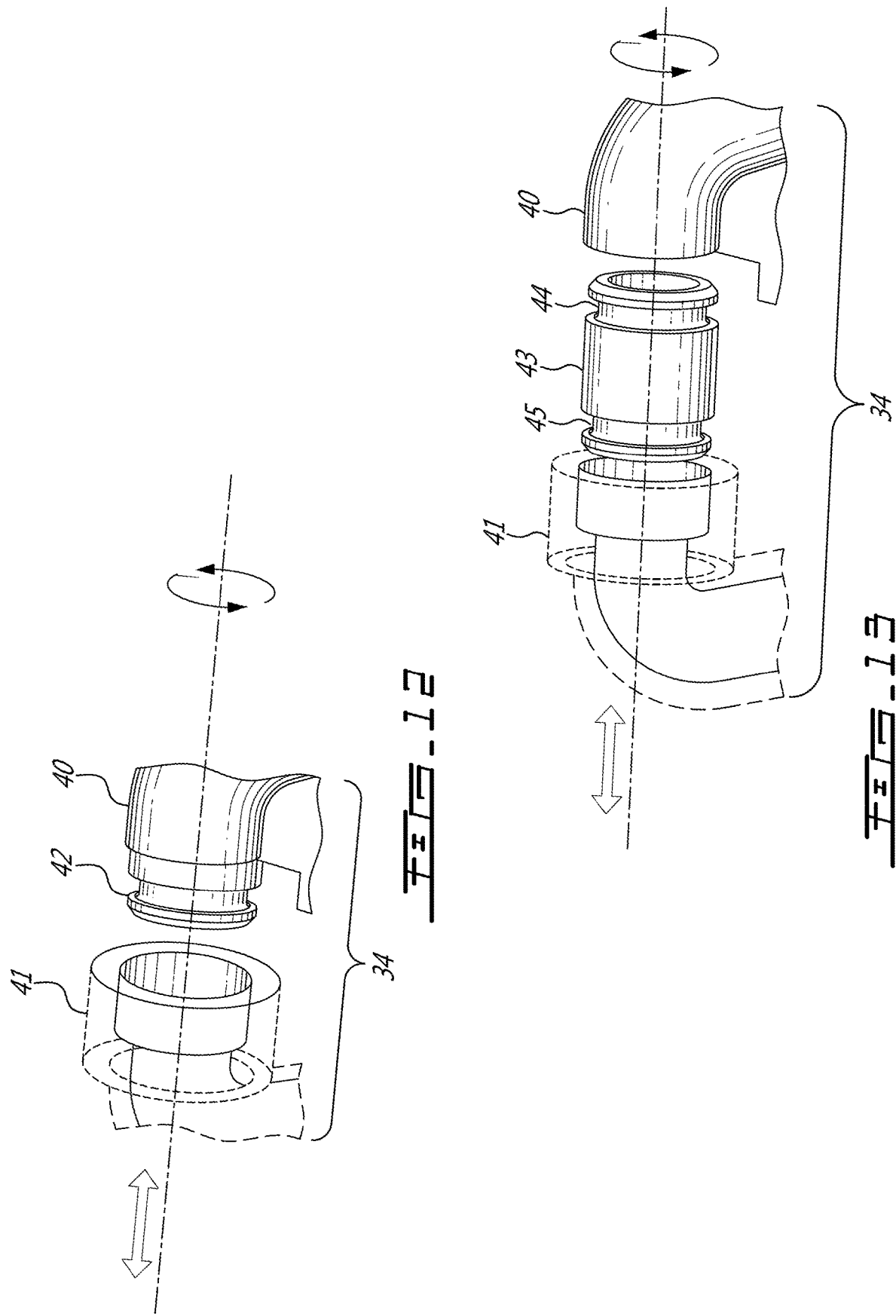

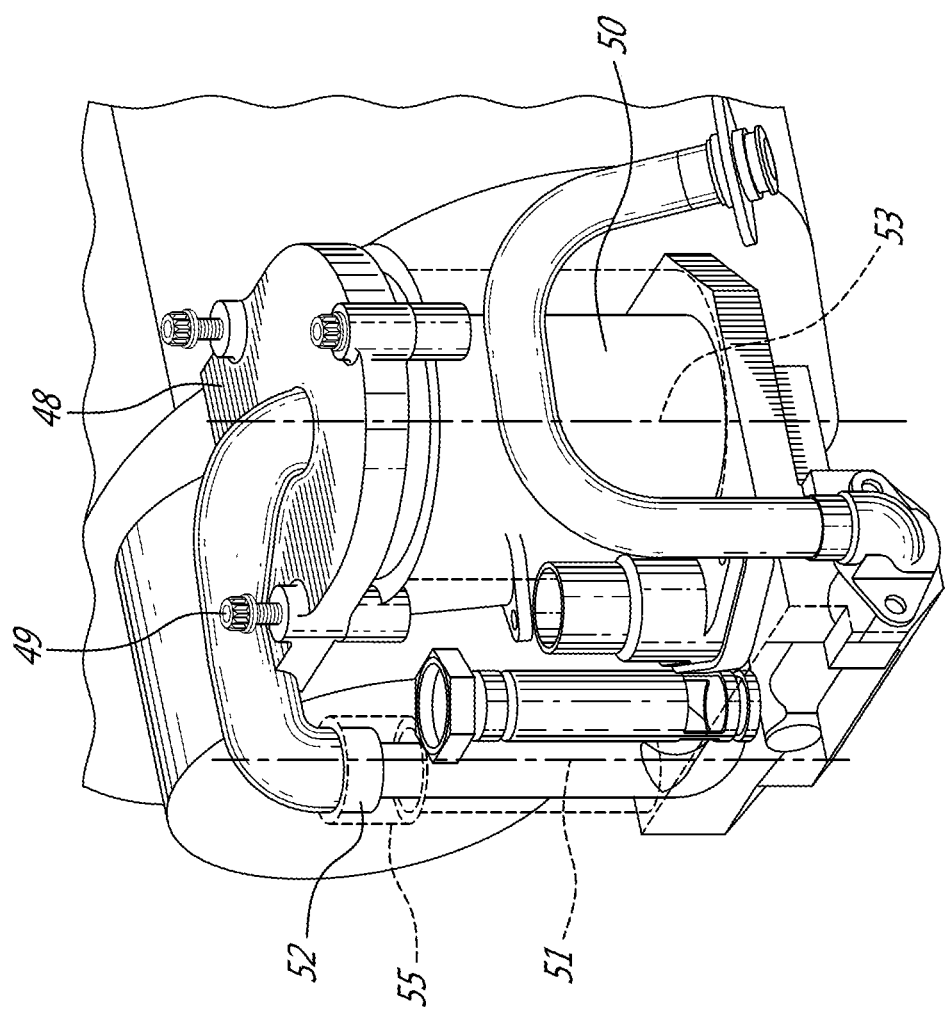

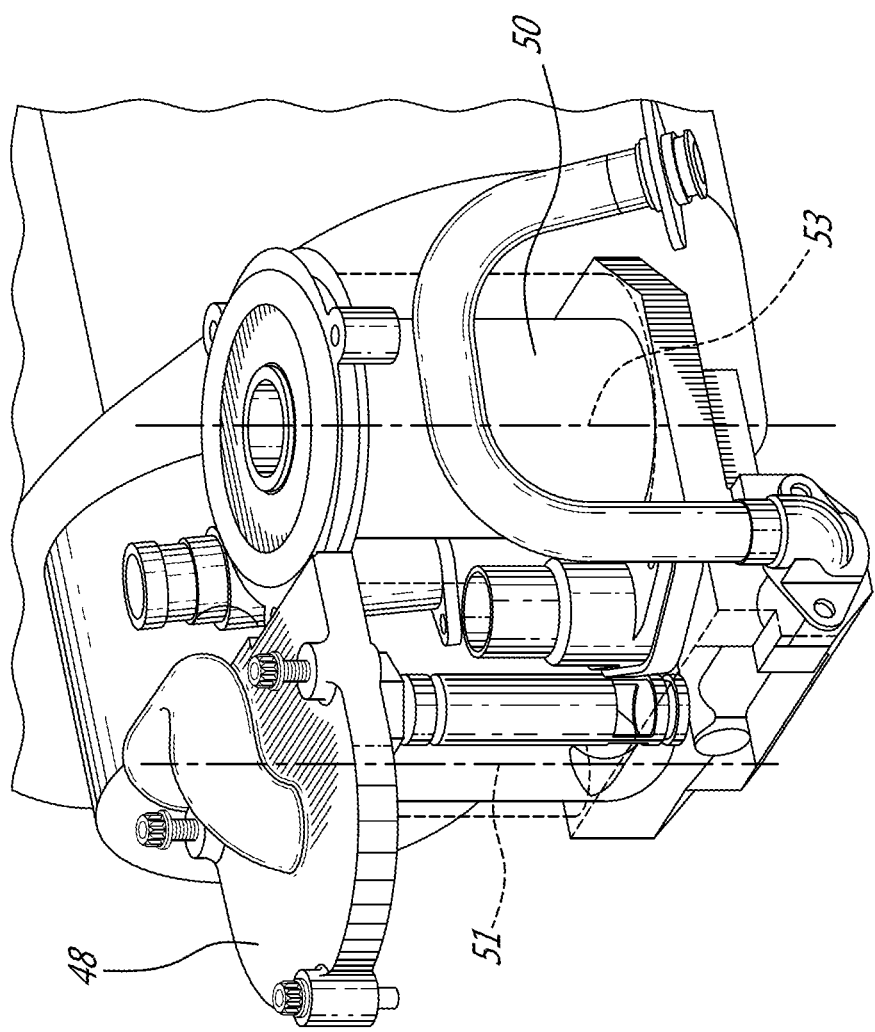

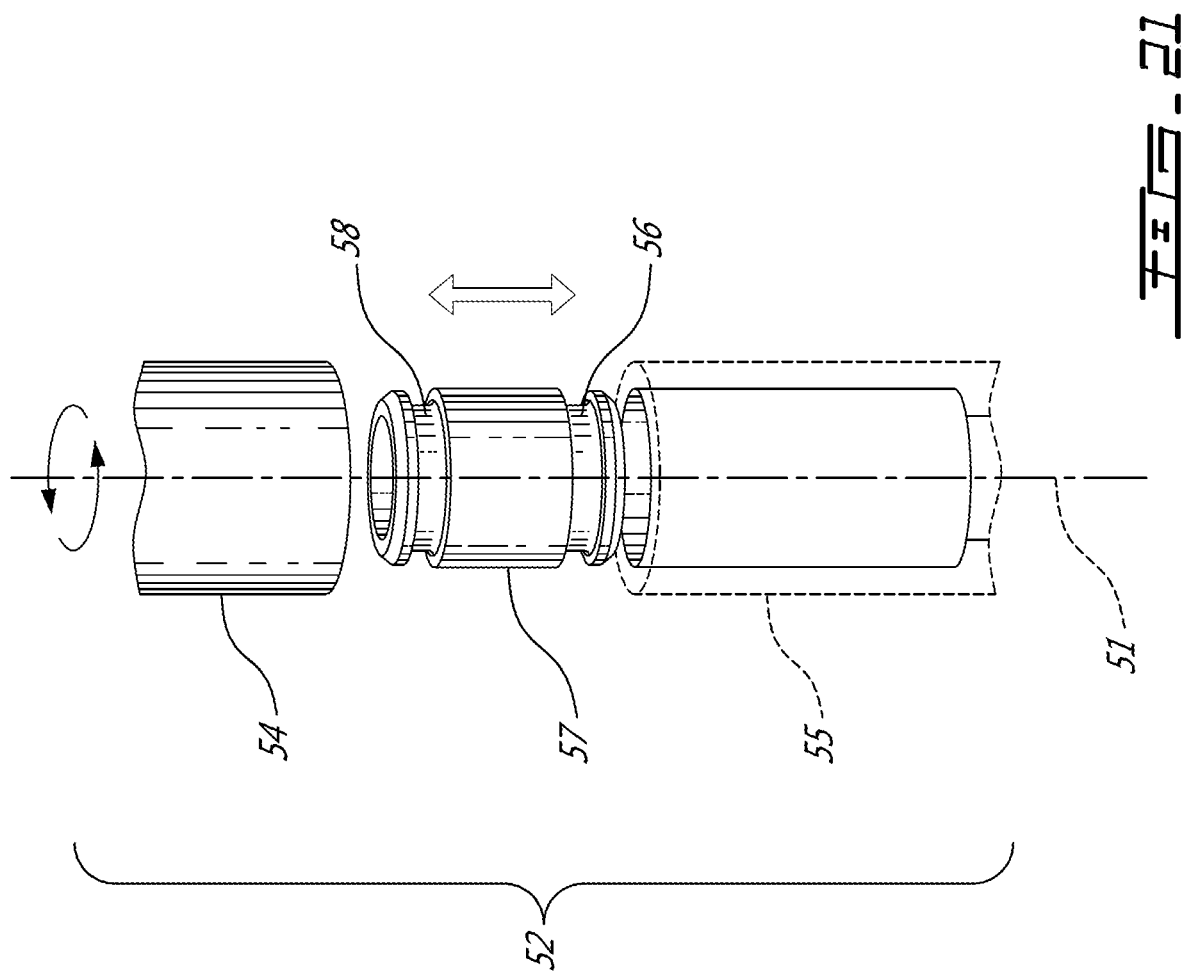

FILTER COVER PROTECTION AGAINST EXTERNAL CONTAMINATION

TECHNICAL FIELD

The disclosure relates to a fluid filter arrangement and, more particularly, to filter cover protection against external contamination.

BACKGROUND

As part of the regular scheduled maintenance of an aircraft gas turbine engine, fluid filters must be replaced, for example oil, fuel and hydraulic fluid.

When the fluid filter is to be changed, the housing is opened and the fluid circulating within the housing is exposed to external contamination. For example, dust particles or debris can be ingested into the housing which would contaminate the fluid, valves and fluid pumps.

Improvement is therefore desirable.

SUMMARY

The disclosure describes a fluid filter arrangement comprising: a fluid circulating system; a filter cartridge; a housing having an internal fluid chamber fluidly connected to the fluid circulating system, the filter cartridge received in the internal fluid chamber, the housing having an open end through which the filter cartridge can pass along a housing axis; and a cover sealed over the open end of the housing in a closed position, the cover in an open position exposing the open end of the housing, the cover including a fluid passage in communication with the internal fluid chamber in the closed position, the fluid passage in communication with the fluid circulating system in the closed position and in the open position. Embodiments can include combinations of the above features.

There is accordingly provided an aircraft fluid filter arrangement comprising: a fluid circulating system; a filter cartridge; a housing having an internal fluid chamber fluidly connected to the fluid circulating system, the filter cartridge received in the internal fluid chamber, the housing having an open end through which the filter cartridge can pass along a housing axis; and a cover sealed over the open end of the housing in a closed position, the cover in an open position exposing the open end of the housing, the cover including a fluid passage in communication with the internal fluid chamber in the closed position, the fluid passage in communication with the fluid circulating system in the closed position and in the open position.

There is also provided an aircraft engine having an engine axis and a fluid filter arrangement with protection against external contamination, the filter arrangement comprising: a fluid circulating system having a first conduit and a second conduit for circulating fluid in opposing first and second directions; a filter cartridge having an exterior surface; a housing disposed above the engine axis and accessible from a top of the engine, the housing having an internal fluid chamber surrounding the exterior surface of the filter cartridge, an open end through which the filter cartridge can pass along a housing axis, and a first fluid passage in communication with the internal fluid chamber and in communication with the first conduit of the fluid circulating system; and a removable cover sealed over the open end of the housing in a closed position, the removable cover in an open position exposing the open end of the housing, the removable cover including a second fluid passage in communication with the internal fluid chamber in the closed position, the second fluid passage being formable and in communication with the second conduit of the fluid circulating system in the closed position and in the open position.

Further details of these and other aspects of the subject matter of this application will be apparent from the detailed description included below and the drawings.

BRIEF DESCRIPTION OF THE DRAWINGS

FIG. 8 is a top isometric view of the removable cover of FIG. 4.

FIG. 9 is a bottom isometric view of the removable cover of FIG. 4.

FIG. 10 is a top side isometric view of the filter housing of FIG. 4 with the removable cover absent to show the cover hinge and bell connection.

FIG. 11 is an alternative top isometric view of a filter housing and removable cover in the closed position, similar to FIG. 4 but with the cover secured with a spring loaded over center latch mechanism, instead of the three bolts that are shown in FIG. 4.

FIG. 12 is an exploded detail of a rotatable bell and spigot connection in the outlet passage of FIG. 4 sealed with an O-ring seal.

FIG. 13 is an exploded detail of an alternative rotatable bell and spigot connection of FIG. 12 having a tubular splice member sealed at both ends with O-rings.

FIG. 18 is a top isometric view of an alternative filter housing and removable cover in the closed position, in accordance with the present description, with a fluid outlet in the cap and a bell-spigot connection within the vertical outlet passage about which the cover rotates on a vertical axis.

FIG. 20 is a top isometric view of the housing in FIG. 19 with the cover released and rotated laterally about the sliding telescoping connection.

FIG. 21 is a detail isometric view of the bell and spigot connection of FIGS. 18-20 that can rotate and translate axially.

DETAILED DESCRIPTION

Figure 1:
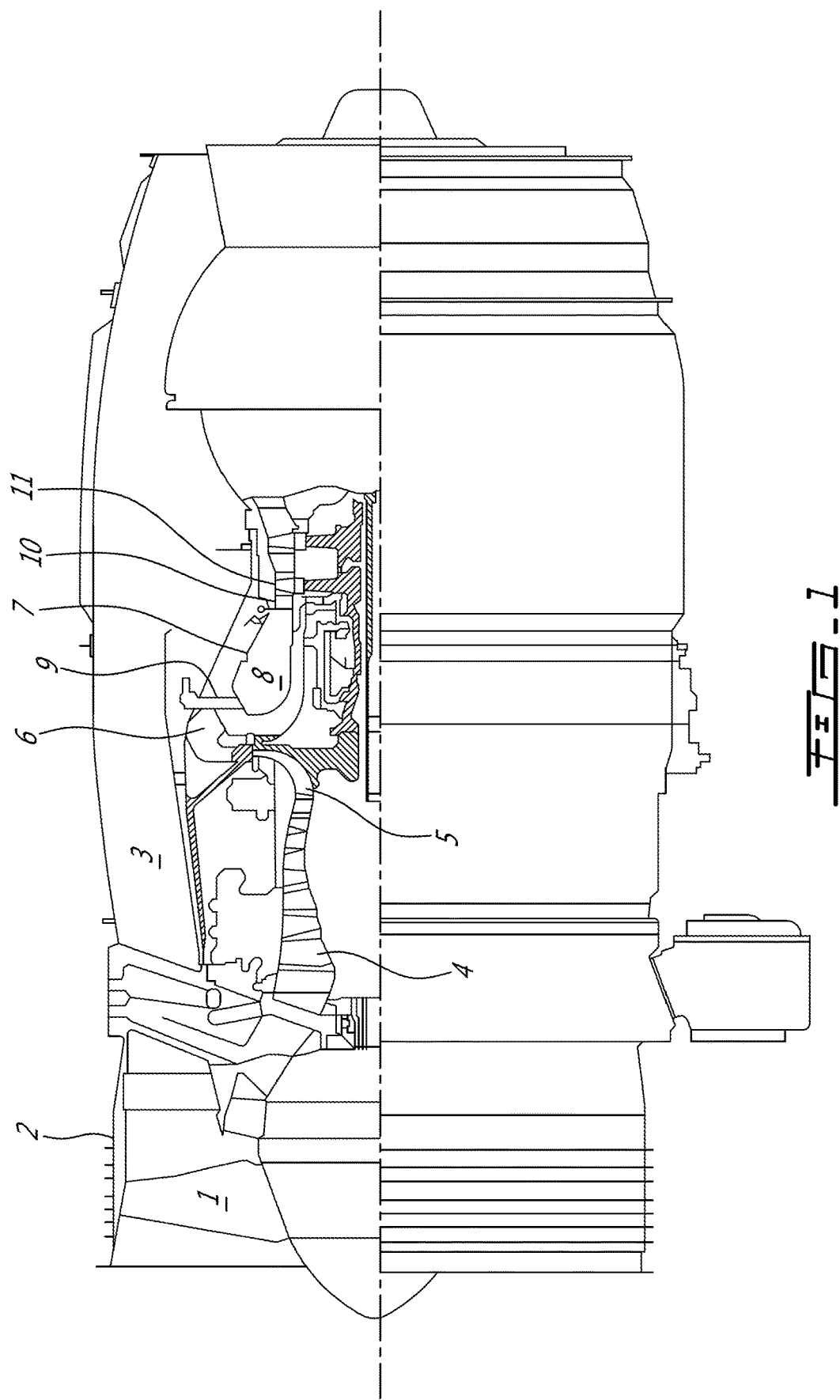
FIG. 1 shows an axial cross-section view of an example turbofan engine.

FIG. 1 shows an axial cross-section through an aircraft engine. According to the illustrated embodiment, the aircraft engine is a turbo-fan gas turbine engine. However, it is understood that the aircraft engine could adopt various other forms. For instance, it could be a turboshaft, a turboprop or even a compounded engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

The present description is directed to fluid filters and filter housing arrangements for fluids used in the operation of the engine of FIG. 1, such as fuel, lubricating oil and hydraulic fluid.

Figure 2:
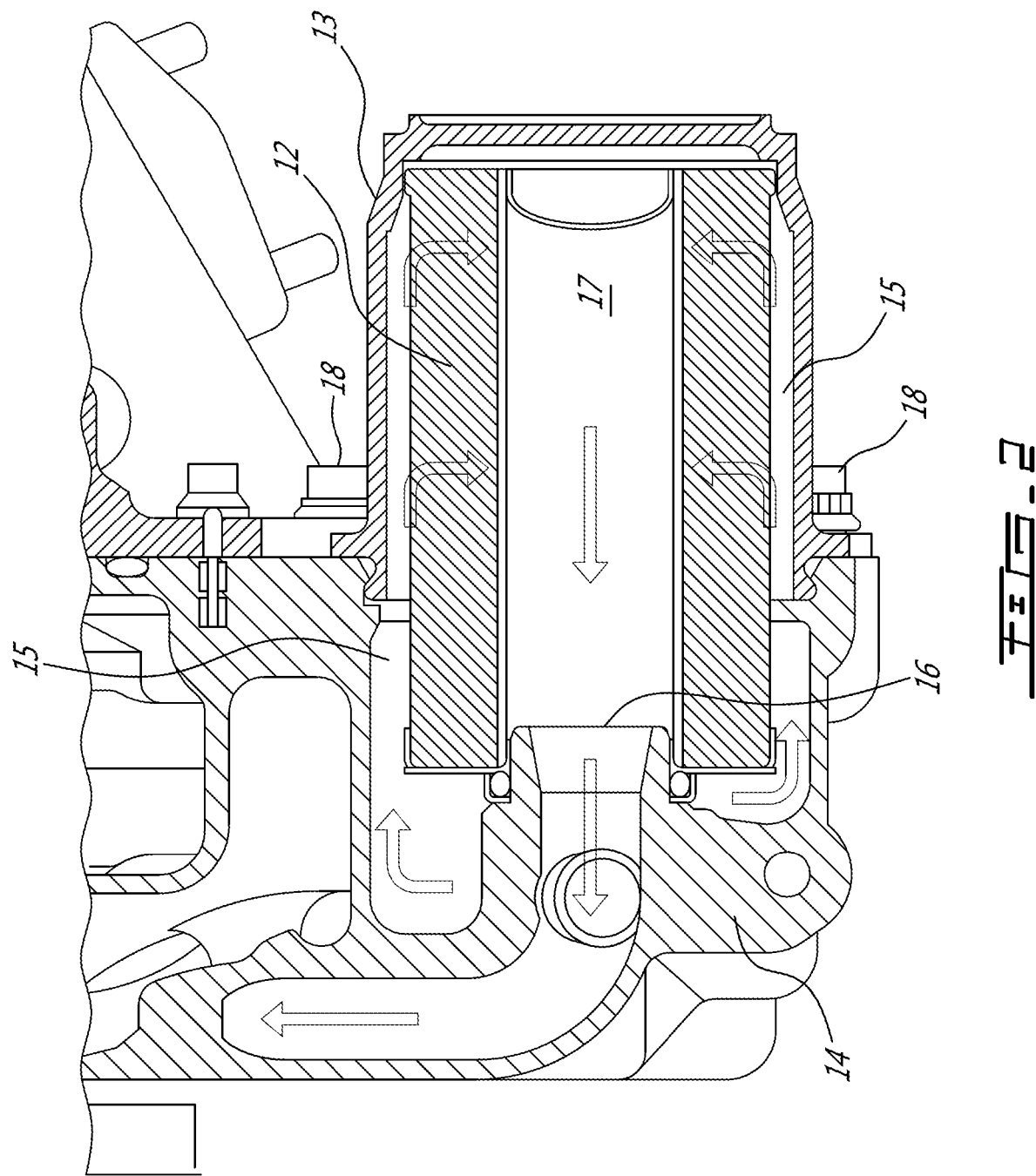
FIG. 2 is an axial sectional view through a first example tubular fluid filter and filter bowl mounted in a horizontal orientation.

FIG. 2 shows an axial cross-section through an example fluid filter 12 and filter bowl housing 13. The manifold mounting 14 supplies unfiltered fluid (e.g. oil) to the exterior annulus 15 defined between the exterior of the filter 12 and the interior of the filter bowl housing 13. The fluid filter 12 may be an accordion folded sheet of filter fabric formed into a cylinder with fluid seals at both axial ends sealed to the filter bowl housing 13 and the outlet conduit 16. As indicated with arrows, fluid is filtered under pressure from the exterior annulus 15, through the fabric fluid filter 12 and into the interior chamber 17 of the filter 12. The filter bowl housing 13 is secured to the manifold mounting 14 with three bolts 18 which can be removed to replace the filter 12. The outlet conduit 16 is oriented laterally and minimizes the exposure to falling dust and debris which could be ingested into the fluid circulating system.

However, if the filter is mounted on the side of the engine, it is difficult to find accessible location for both engines on a twin-engine application. The horizontal filter is good to prevent contamination of the outlet during filter maintenance, but is challenging from an accessibility perspective. A vertical filter or an upstanding filter, in some cases, may expose the outlet to falling debris during the maintenance, but is more accessible from the top for a twin-engine application. The accessibility requirement may drive for an upstanding filter.

Figure 3:
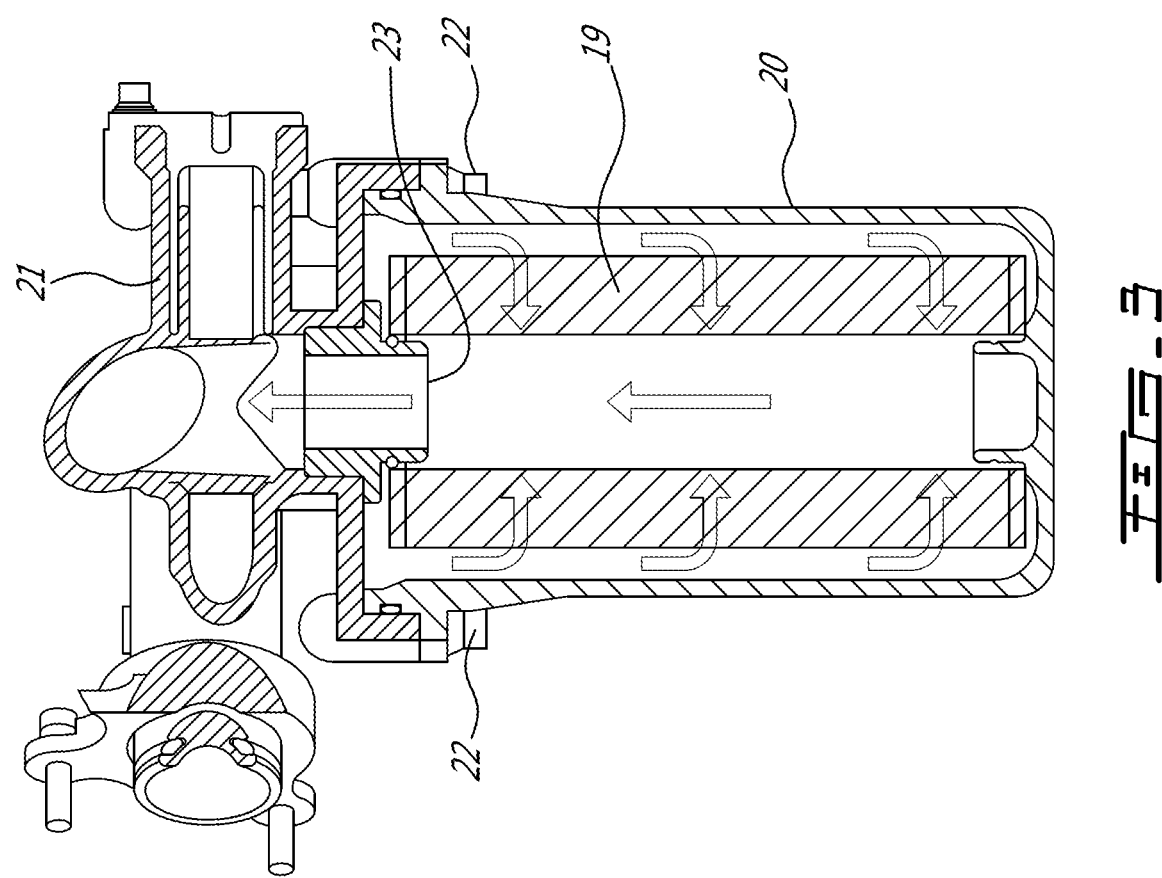
FIG. 3 is an axial sectional view through a second example tubular fluid filter and filter bowl mounted in a vertical orientation.

FIG. 3 shows a further example filter 19 and filter bowl housing 20 that is secured to a manifold mounting 21 with bolts 22. Fluid circulates as indicated with arrows in a manner similar to the arrangement of FIG. 2. The filter 19 and filter bowl housing 20 are oriented vertically which impedes the entry of falling dust or debris into the outlet conduit 23. However, if the filter bowl housing 20 is located at the bottom of an engine, visualization and mechanical access to the bolts 22 may be restricted. If the filter bowl housing 20 is located at the top of an engine, bolts 22 are accessible but access to the filter bowl housing 20 and filter 19 may be restricted.

Figure 4:
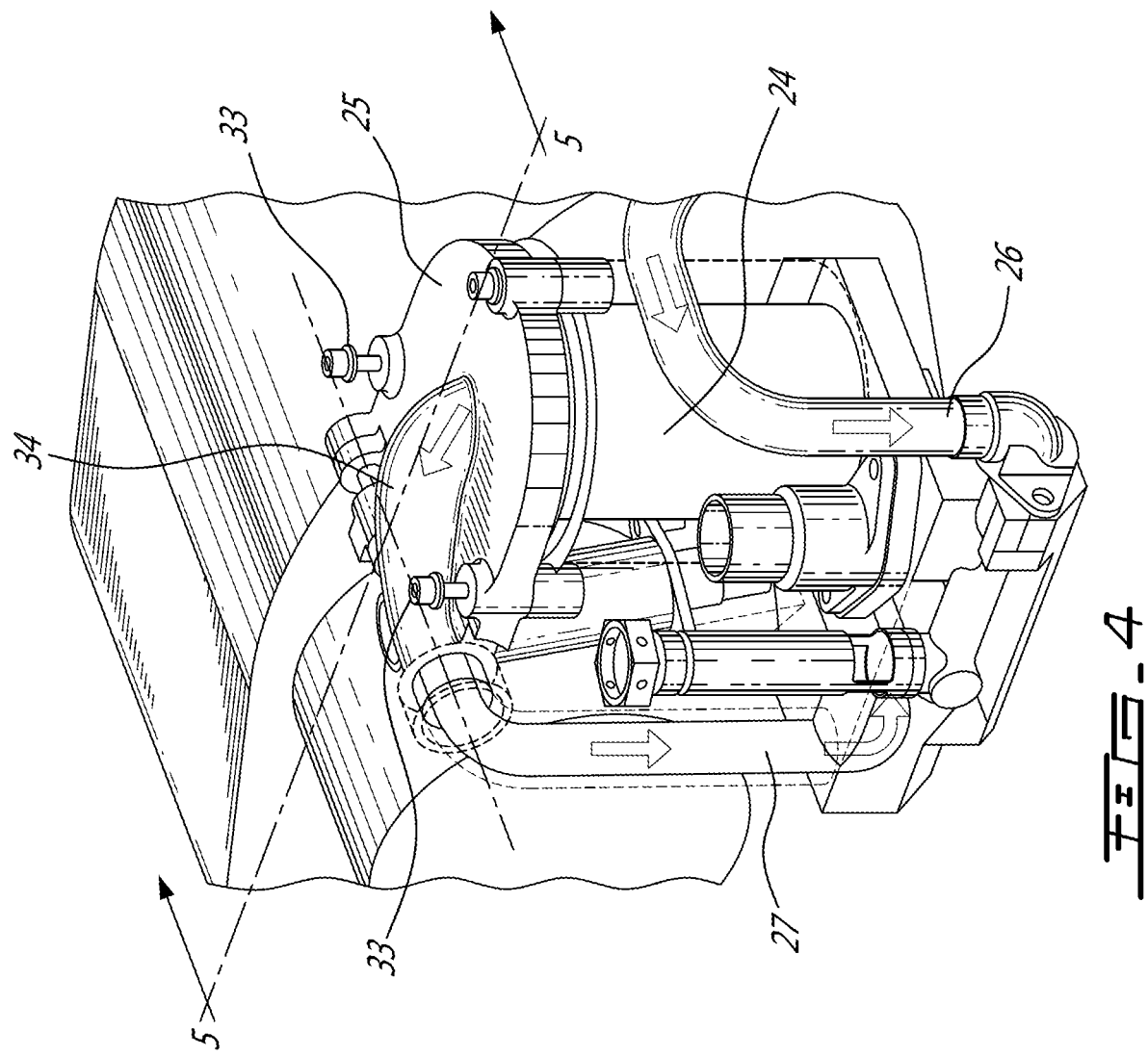
FIG. 4 is a top isometric view of a filter housing and removable cover in the closed position, in accordance with the present description, with a fluid outlet in the cap and a bell and spigot connection within the horizontal outlet passage about which the cover rotates on a horizontal axis.
Figure 5:
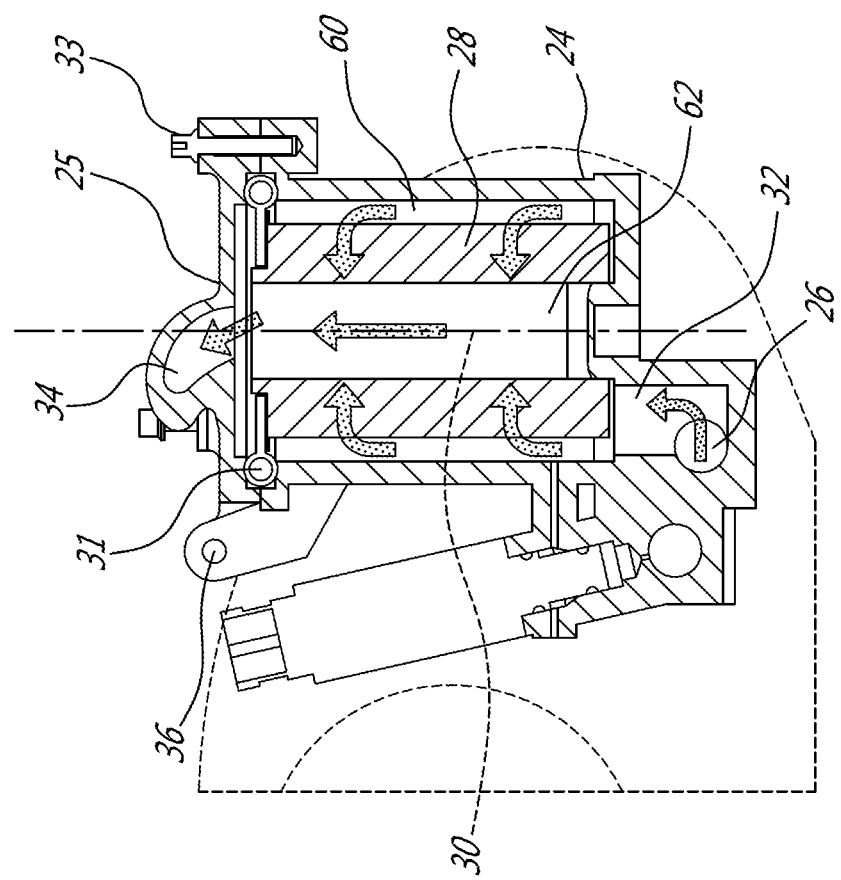
FIG. 5 is a vertical sectional view along line 5-5 of FIG. 4 (closed position).

FIGS. 4-5 together with the present description illustrate alternative filter housings and a removable cover where the cover can be rotated and/or axially translated without disconnecting a fluid conduit within the cover. The fluid conduit in the cover can be either an inlet or an outlet. The cover arrangement impedes entry of debris into the fluid conduit. The cover, fasteners and filter are accessible from the top of an engine thereby improving visibility and physical access.

FIG. 4 shows a top isometric view of a filter housing 24 and removable cover 25 in the closed position. FIG. 5 is a vertical sectional view along line 5-5 of FIG. 4 in the closed position. The fluid filter arrangement receives unfiltered fluid under pressure from a pump and conveys filtered fluid to various engine components. In the embodiment illustrated, the fluid circulating system includes a first conduit 26 into the filter housing 24 and a second conduit 27 connected to the removable cover 25 for circulating fluid through the filter housing 24 in opposite directions. In the example, as indicated with arrows in FIG. 5, the first conduit 26 supplies unfiltered fluid to the filter housing 24 and the second conduit 27 conveys filtered fluid from the filter housing 24. However the flow directions through the conduits 26, 27 may be reversed.

Referring to FIG. 5, the fluid filter cartridge 28 is a cylindrical tube with an exterior surface that receives unfiltered fluid under pressure from the inlet or first conduit 26. The filter housing 24 has a cylindrical internal fluid chamber surrounding the exterior surface of the fluid filter cartridge 24 defining an annular fluid filled outer passage. As indicated with arrows, the fluid is filtered under pressure from the exterior annulus 60 through the fabric filter 28 and into the interior chamber 62 of the filter 28.

Figure 6:
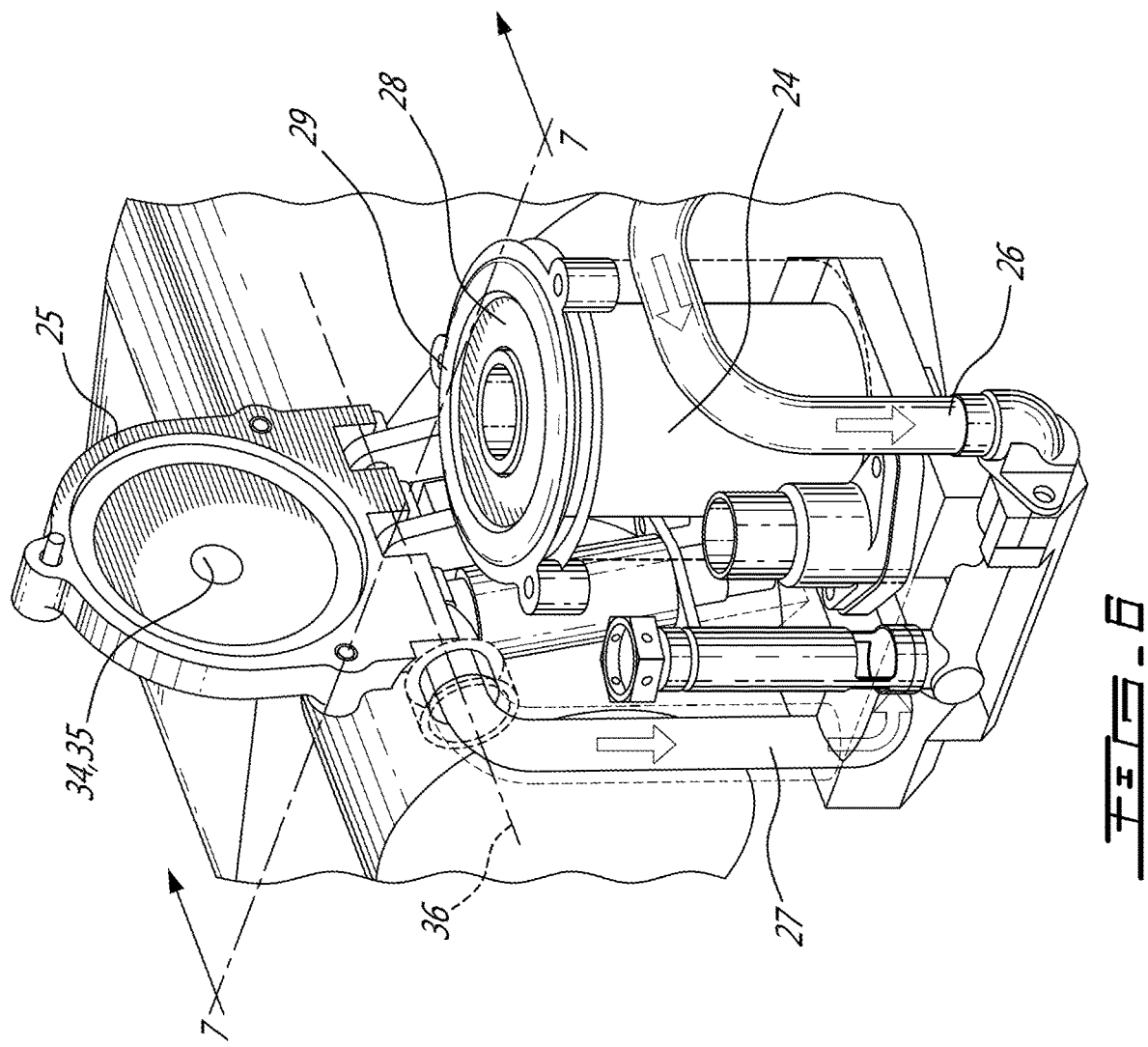
FIG. 6 is a top isometric view of the filter housing and removable cover of FIG. 4 in the open position.
Figure 7:
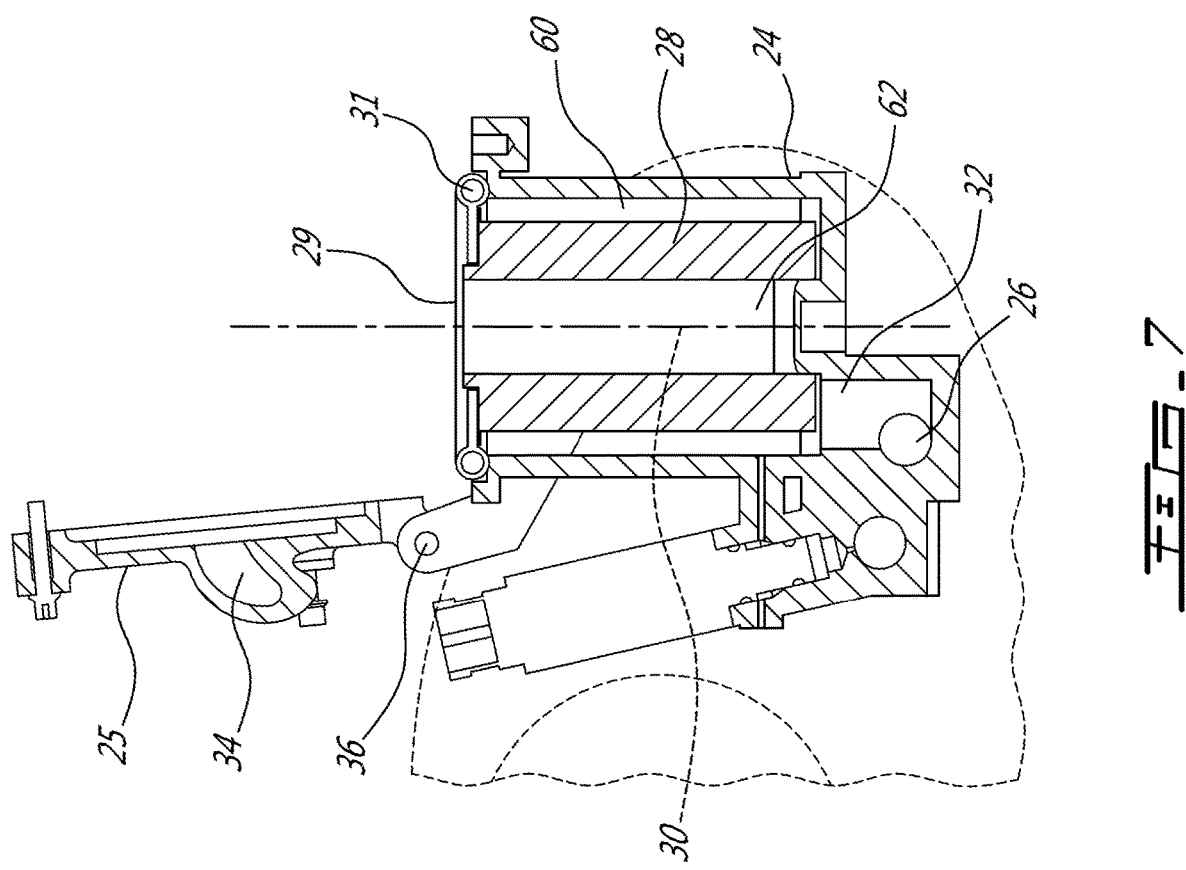
FIG. 7 is a vertical sectional view along line 7-7 of FIG. 6 (open position).

FIGS. 6-7 show the removable cover 25 in an open position, while FIGS. 4-5 show the closed position. The filter housing 24 has an open end 29 through which the fluid filter cartridge 28 can pass along the vertical housing axis 30 during removal and replacement. An annular O-ring seal 31 about the upper rim of the filter housing 24 seals the removable cover 25 to the filter housing 24 and may also secure the fluid filter cartridge 28 in place.

Referring to FIG. 5, a first fluid passage 32 communicates between the internal fluid chamber of the filter housing 24 and the first conduit 26 of the fluid circulating system to intake unfiltered fluid in the example illustrated. The removable cover 25 is sealed over the open end 29 of the filter housing 24 in the closed position shown in FIGS. 4-5 with bolts 33. The bolts 33 can be captive within the removable cover 25 to avoid loss or ingestion into the engine.

Referring to FIGS. 6-7, the removable cover 25 in the open position exposes the open end 29 of the filter housing 24 so that the fluid filter cartridge 28 can be removed and replaced. The removable cover 25 has a second fluid passage 34 located in the center of the cover 25 in communication with the internal fluid chamber in the closed position. The second fluid passage receives filtered fluid from the center of the fluid filter cartridge 28.

In the examples the fluid filter cartridge 28 is a cylindrical tube with an exterior inlet surface and an interior outlet surface, the interior outlet surface being sealed to the removable cover 25 and in communication with the second fluid passage 34 in the closed position. The exterior inlet surface of the fluid filter cartridge 28 is in communication with the first fluid passage 32 in the closed position.

As will be described in detail below, the second fluid passage 34 is formable or changeable in shape so that fluid communication or connection to the second conduit 27 is continuous in the closed position (FIGS. 4-5) and in the open position (FIGS. 6-7). The entry of dust or debris into the second conduit 27 is impeded by the continuous connection of the cover 25 to the formable second fluid passage 34 and second conduit 27. The removable cover 25 may include a one way flap valve to further impede entry of dust or debris into the second fluid passage 34.

To provide a formable second fluid passage 34, a simple flexible hose could be used. However the durability and reliability of a flexible hose is reduced compared to a series of rigid tubes and fittings joined with O-ring seals as shown in FIGS. 8-13 and described below.

FIGS. 8-9 show top and bottom views of the removable cover 25 and bolts 33. FIG. 9 shows a central port 35 that conveys fluid into the second fluid passage 34. The second fluid passage 34 has a longitudinal axis 36 about which the removable cover 25 rotates as shown in FIGS. 4 and 6. A hinge pin 37 connects the removable cover 25 to rotate about the hinge axis relative to the filter housing 24. The longitudinal axis 36 of the second fluid passage 34 and the hinge axis are coaxial in the embodiment shown in FIGS. 4-22. The hinge axis may be offset (not coaxial) from the longitudinal axis 36 of the second fluid passage 34 if the second fluid passage is sufficiently formable i.e. made of a flexible hose or includes additional axial sliding or rotating sealed joints for greater flexibility. The fitting alone could be used as a hinge.

FIG. 10 shows the filter housing 24 with the cover 25 removed. The mounting brackets 38 on the filter housing have holes for the hinge pin 37 aligned with the longitudinal axis 36 of the second fluid passage 34. The longitudinal axis 36 of the second fluid passage 34 is transverse to the housing axis 30. Accordingly the cover 25 rotates about the longitudinal axis 36 between open and closed positions shown in FIGS. 6 and 4 respectively.

However, a hinge is not included in the embodiment shown in FIGS. 21-23 which is described in detail below. Various means can be provided to ensure that the second fluid passage 34 is formable (i.e. can change shape) such as a flexible hose or by providing multiple rotational or axial sliding joints sealed with O-rings.

The formable feature of the second fluid passage 34 is best seen in FIG. 12, with reference to FIGS. 8-11. In FIG. 11, the filter housing 24 and removable cover 25 are connected with a spring loaded latch 39. However, in all other respects the arrangement is identical to FIGS. 8-10.

Referring to FIGS. 11-12, the second fluid passage 34 comprises an upstream member 40 and a downstream member 41 sealed together with a rotary O-ring seal 42 to rotate about the longitudinal axis 36 between the closed position and the open position. In the example shown in FIG. 11, the second fluid passage 34 comprises a bell member (downstream member 41) and a spigot member (upstream member 40) slidingly rotatably sealed together with an annular O-ring seal 42. The spigot member (upstream member 40) rotates about the longitudinal axis relative to the bell member (downstream member 41) between the closed position and the open position. However the bell and spigot orientation could be reversed. Further the rotary O-ring seal 42 can be a single or multiple tandem O-rings.

As shown in the alternative of FIG. 13, the bell member (downstream member 41) and a spigot member (upstream member 40) can be joined by a splice member 43 having an upstream annular seal 44 and a downstream annular seal 45 sealingly engaging the upstream member 40 and the downstream member 41 respectively. The splice member 43 can simplify assembly, provide redundancy or reduce O-ring (44, 45) wear. Since the upstream member 40 in FIG. 13 is a bell member, repairs can include replacing the splice member 43 with seals 44, 45 together as a replacement assembly.

Figure 15:
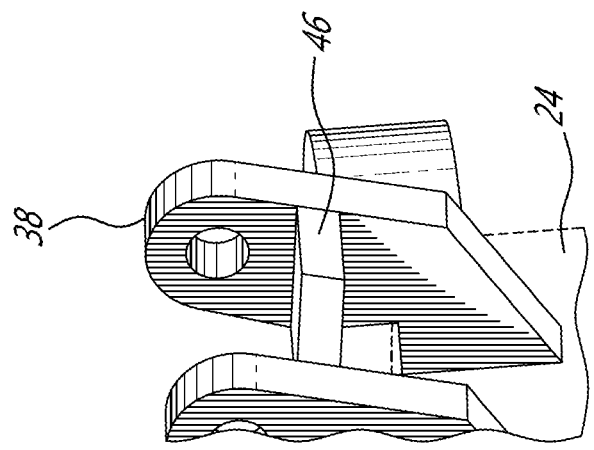
FIGS. 14 and 15 are detail views of rotational stop, the cover hinge with the removable cover absent.
Figure 14:
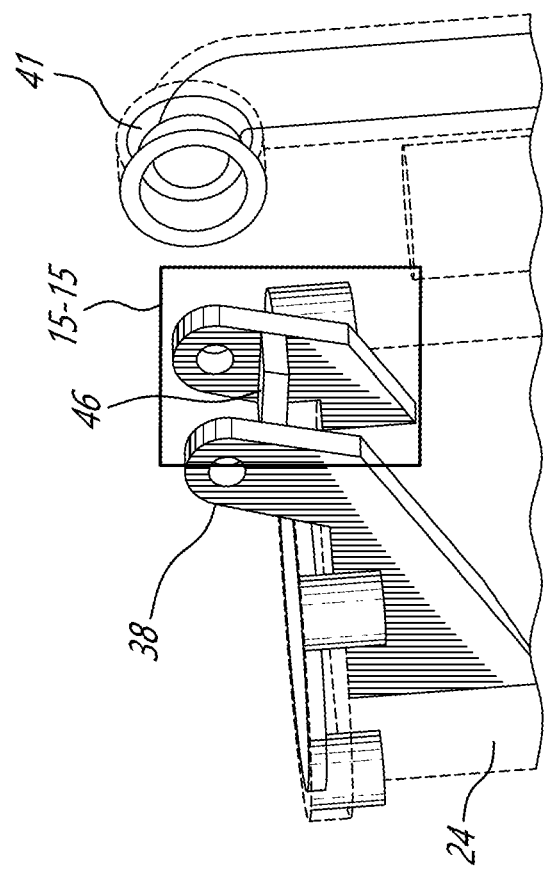
Figure 17:
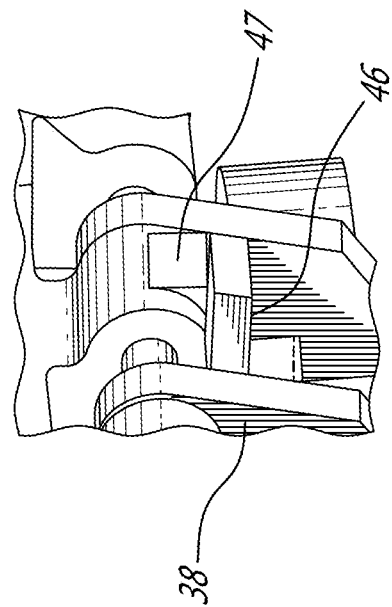
FIGS. 16 and 17 are detail views of rotational stop, the cover hinge with the removable cover present.
Figure 16:
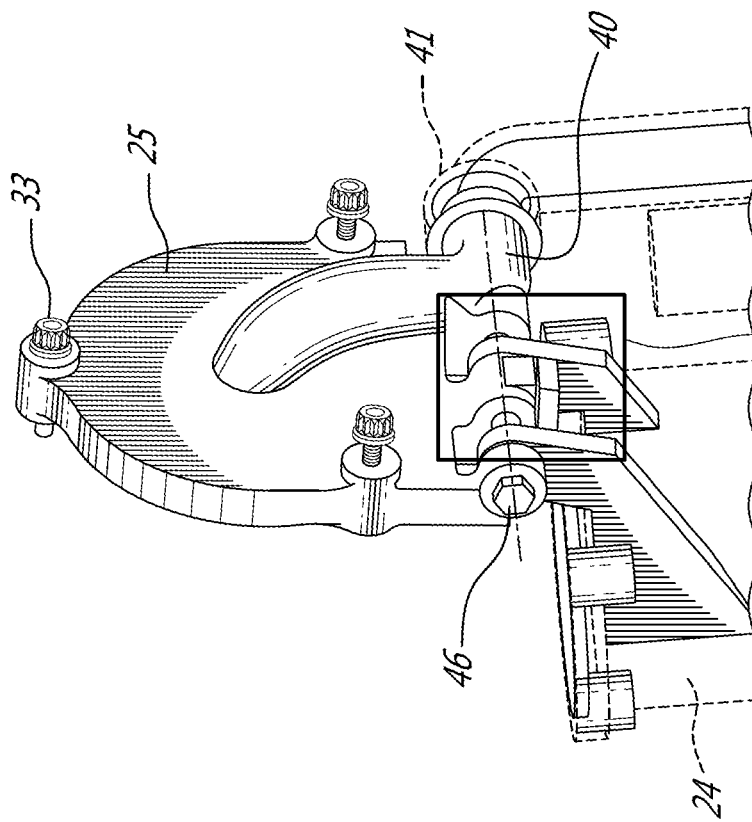

FIGS. 14-17 show an option wherein the hinge includes a rotational stop for restricting rotation of the removable cover 25 to a range bounded by the closed position and the open position. FIGS. 14-15 show the rotational stop includes a housing tab 46. As seen in FIGS. 16-17, the housing tab 46 abuts a cover tab 47 in the open position.

Figure 19:
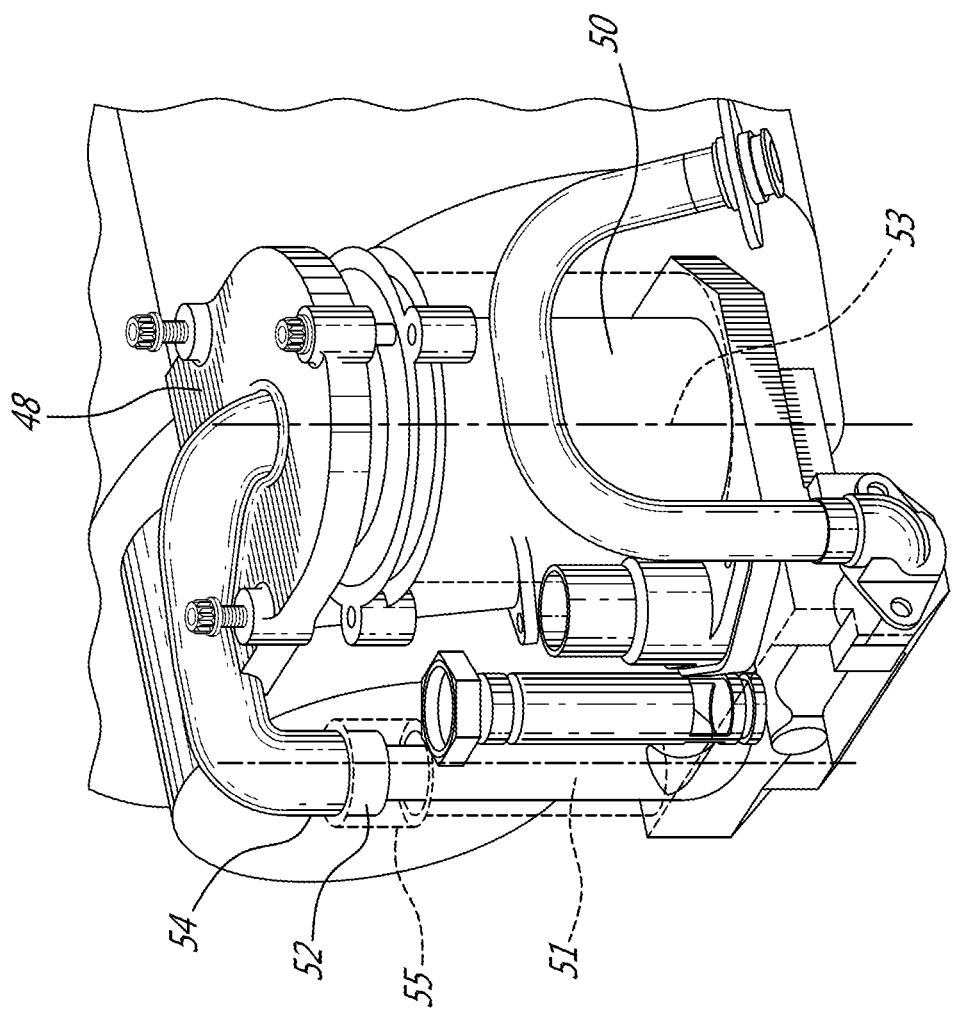
FIG. 19 is a top isometric view of the housing in FIG. 18 with the cover released and translated axially vertically on a sliding telescoping connection in the second fluid conduit.

FIGS. 18-21 show an alternative fluid filter arrangement. FIG. 18 shows the closed position with the removable cover 48 secured with bolts 49 to the filter housing 50. In FIG. 19 the bolts 49 are removed and the removable cover 48 is lifted vertically away from the filter housing 50. The longitudinal axis 51 of the second fluid passage 52 is parallel to the housing axis 53. With reference to FIG. 21, the second fluid passage 52 has an upstream member 54 and a downstream member 55 that are sealed together with a longitudinal O-ring seal (56 and/or 58) to telescope or translate axially relative to each other along the longitudinal axis 51 between the closed position (FIG. 18) and the open position (FIG. 20).

In relation to FIGS. 4-17, the second fluid passage 52 of FIGS. 18-21 is oriented vertically instead of horizontally. The vertical orientation allows the removable cover 48 to be raised or lifted from the filter housing 50. The second fluid passage 52 has a telescoping bell and spigot joint as seen in the example of FIG. 21. The removable cover 48 can be raised-lowered and also rotated since the second fluid passage 52 has an upstream member 54 and a downstream member 55 slidingly sealed together with an annular O-ring seal 56. The longitudinal axis 51 of the second fluid passage 52 is parallel to the housing axis 53 (see FIG. 20). As a result, the upstream member 54 and removable cover 48 can move axially and rotate as indicated with arrows in FIG. 21. The alternative shown in FIG. 21 also includes a splice member 57 with O-ring seals 56 and 58 at both ends. The splice member 57 can slide vertically within the bell members (54, 55) and the upstream member 54 can rotate relative to the downstream member 55 due to the sliding sealing contact of the O-ring seals 56, 58.

Accordingly the upstream member 53 and the downstream member 55 are sealed together with a longitudinal seal 56, 58 to translate axially and rotate relative to each other on the longitudinal axis 51 between the closed position and the open position.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft fluid filter arrangement comprising:
    a fluid circulating system including a manifold mounting;
    a filter cartridge;
    a housing having an internal fluid chamber fluidly connected to the fluid circulating system, the housing fastened to the manifold mounting, the filter cartridge received in the internal fluid chamber, the housing having an open end through which the filter cartridge can pass along a housing axis; and a cover movable relative to the fluid circulating system and the housing between an open position and a closed position; the cover sealed over the open end of the housing in the closed position, the cover in the open position exposing the open end of the housing, the cover including a fluid passage in communication with the internal fluid chamber in the closed position, the fluid passage in communication with the fluid circulating system in the closed position and in the open position, wherein the fluid passage of the cover remains fluidly connected to fluid circulating system while the cover is moved from the closed position to the open position.

2. The aircraft fluid filter arrangement according to claim 1 wherein the fluid passage includes a flexible hose.

3. The aircraft fluid filter arrangement according to claim 1 wherein the fluid passage has a longitudinal axis, the fluid passage includes an upstream member and a downstream member sealed together with a rotary seal to rotate about the longitudinal axis between the closed position and the open position.

4. The aircraft fluid filter arrangement according to claim 3, wherein the longitudinal axis of the fluid passage is transverse to the housing axis.

5. The aircraft fluid filter arrangement according to claim 4, comprising a hinge connecting the cover to rotate about a hinge axis relative to the housing, wherein the longitudinal axis of the fluid passage and hinge axis are coaxial.

6. The aircraft fluid filter arrangement according to claim 5, wherein the longitudinal axis of the fluid passage is laterally aligned with the hinge axis.

7. The aircraft fluid filter arrangement according to claim 5, wherein the hinge includes a rotational stop for restricting rotation of the cover to a range bounded by the closed position and the open position.

8. The aircraft fluid filter arrangement according to claim 7, wherein the rotational stop comprises a housing tab that abuts a cover tab in the open position.

9. The aircraft fluid filter arrangement according to claim 3,
wherein the fluid passage comprises a bell member and a spigot member slidingly sealed together with an annular seal, and
wherein the spigot member rotates about the longitudinal axis relative to the bell member between the closed position and the open position.

10. The aircraft fluid filter arrangement according to claim 3, wherein the longitudinal axis of the fluid passage is parallel to the housing axis.

11. The aircraft fluid filter arrangement according to claim 3, wherein the upstream member and the downstream member are sealed together with a longitudinal seal to translate axially relative to each other along the longitudinal axis between the closed position and the open position.

12. The aircraft fluid filter arrangement according to claim 11,
wherein the fluid passage comprises a bell member and a spigot member slidingly sealed together with an annular seal, and
wherein the bell member axially slides along the longitudinal axis relative to the spigot member between the closed position and the open position.

13. The aircraft fluid filter arrangement according to claim 11, wherein the longitudinal seal includes a splice member having an upstream annular seal and a downstream annular seal sealingly engaging the upstream member and the downstream member respectively.

14. The aircraft fluid filter arrangement according to claim 1 wherein the housing axis has an upstanding orientation.

15. The aircraft fluid filter arrangement according to claim 1 wherein the housing and cover are connected with a plurality of bolts.

16. The aircraft fluid filter arrangement according to claim 15 wherein the bolts are captive within the cover.

17. The aircraft fluid filter arrangement according to claim 1 wherein the housing and the cover are connected with a spring loaded latch.

18. The aircraft fluid filter arrangement according to claim 1 wherein the filter cartridge is a cylindrical tube with an exterior inlet surface and an interior outlet surface, the interior outlet surface being sealed to the cover and in communication with the fluid passage in the closed position.

19. An aircraft engine having an engine axis and a fluid filter arrangement with protection against external contamination, the filter arrangement comprising:
a fluid circulating system having a first conduit and a second conduit for circulating fluid in opposing first and second directions;
a filter cartridge having an exterior surface;
a housing disposed above the engine axis and accessible from a top of the engine, the housing fastened to a manifold mounting of the fluid circulating system, the housing having an internal fluid chamber surrounding the exterior surface of the filter cartridge, an open end through which the filter cartridge can pass along a housing axis, and a first fluid passage in communication with the internal fluid chamber and in communication with the first conduit of the fluid circulating system; and
a removable cover sealed over the open end of the housing in a closed position, the removable cover in an open position exposing the open end of the housing, the removable cover including a second fluid passage in communication with the internal fluid chamber in the closed position, the second fluid passage being formable and in communication with the second conduit of the fluid circulating system in the closed position and in the open position, wherein the second fluid passage of the removable cover remains fluidly connected to the second conduit of the fluid circulating system while the removable cover is moved from the closed position to the open position.

20. The aircraft engine according to claim 19 wherein the removable cover is rotatable about an axis of a hinge connecting the cover to the housing, and wherein the second conduit has a fluid interface aligned with the axis of the hinge.

* * * * *